(12) United States Patent
Benisty et al.

(10) Patent No.: US 12,346,261 B2
(45) Date of Patent: Jul. 1, 2025

(54) WRITE BUFFER LINKING FOR EASY CACHE READS

(71) Applicant: Western Digital Technologies, Inc., San Jose, CA (US)

(72) Inventors: Shay Benisty, Beer Sheva (IL); Judah Gamliel Hahn, Ofra (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/353,862

(22) Filed: Jul. 17, 2023

(65) Prior Publication Data

US 2024/0143512 A1 May 2, 2024

Related U.S. Application Data

(60) Provisional application No. 63/421,327, filed on Nov. 1, 2022.

(51) Int. Cl.
  *G06F 12/0897* (2016.01)
  *G06F 3/06* (2006.01)
  *G06F 12/02* (2006.01)
  *G06F 12/10* (2016.01)

(52) U.S. Cl.
  CPC ...... *G06F 12/0897* (2013.01); *G06F 12/0246* (2013.01); *G06F 12/10* (2013.01); *G06F 3/0679* (2013.01); *G06F 2212/1016* (2013.01)

(58) Field of Classification Search
  None
  See application file for complete search history.

(56) References Cited

U.S. PATENT DOCUMENTS

| | | | | |
|---|---|---|---|---|
| 6,226,715 B1 * | 5/2001 | Van Der Wolf | ...... | G06F 12/121 711/E12.07 |
| 6,490,635 B1 * | 12/2002 | Holmes | ................. | G06F 3/0676 710/24 |
| 7,475,321 B2 * | 1/2009 | Gurumurthi | ........ | G06F 11/0724 711/155 |

(Continued)

OTHER PUBLICATIONS

Jim Handy, "the Cache Memory book: THE Authoritative reference on cache design", 2nd Edition, 1998, pp. 2-22 (Year: 1998).*

(Continued)

*Primary Examiner* — Christopher D Birkhimer
(74) *Attorney, Agent, or Firm* — PATTERSON + SHERIDAN, LLP

(57) ABSTRACT

The present disclosure generally relates to improved optimization of a cache lookup operation by structuring the write cache buffers differently using a link-list. Rather than executing a read command first and then executing a write command only after the read command is executed, this disclosure suggests reordering the command executions. A device waits before executing the read command giving the opportunity to obtain the overlap write command. The device then reorders the command execution and executes first the write command and then executes the read command by accessing the write cache instead of the NAND. When two write commands need to be executed consecutively, the link-list operation is used. The controller finds the relevant buffer in the cache that is needed and overwrites the buffer with the new data. The new data is then written to the cache without accessing the cache multiple times.

15 Claims, 10 Drawing Sheets

(56) References Cited

U.S. PATENT DOCUMENTS

| | | | |
|---|---|---|---|
| 8,327,187 B1* | 12/2012 | Metcalf | G06F 9/544 |
| | | | 714/10 |
| 8,429,359 B1* | 4/2013 | Desai | G06F 11/1461 |
| | | | 711/E12.103 |
| 8,538,919 B1* | 9/2013 | Nielsen | H04L 63/0272 |
| | | | 718/1 |
| 8,593,678 B2* | 11/2013 | Ohishi | H04N 1/2166 |
| | | | 358/1.15 |
| 8,732,409 B2* | 5/2014 | Van Der Wolf | G06F 12/0804 |
| | | | 711/143 |
| 9,075,705 B2* | 7/2015 | Hikichi | G06F 11/004 |
| 9,092,182 B2* | 7/2015 | Ohishi | H04N 1/00944 |
| 9,344,596 B2* | 5/2016 | Ohishi | H04N 1/00973 |
| 9,424,210 B1* | 8/2016 | Cope | G06F 12/0607 |
| 9,632,711 B1* | 4/2017 | Obr | G06F 3/0619 |
| 9,645,752 B1* | 5/2017 | Obr | G06F 12/0868 |
| 9,800,291 B1* | 10/2017 | Ben David | G06F 11/1415 |
| 9,892,803 B2* | 2/2018 | Reed | G06F 12/0811 |
| 11,314,635 B1* | 4/2022 | Volpe | G06F 11/004 |
| 2002/0083277 A1* | 6/2002 | Sundararaman | G06F 12/0897 |
| | | | 711/E12.043 |
| 2004/0039880 A1* | 2/2004 | Pentkovski | G06F 12/0811 |
| | | | 711/146 |
| 2004/0117414 A1* | 6/2004 | Braun | G06F 8/65 |
| 2004/0148482 A1* | 7/2004 | Grundy | G06F 13/4256 |
| | | | 711/104 |
| 2006/0005074 A1* | 1/2006 | Yanai | G06F 11/2066 |
| | | | 714/6.32 |
| 2006/0143406 A1* | 6/2006 | Chrysos | G06F 12/0811 |
| | | | 711/143 |
| 2006/0156155 A1* | 7/2006 | Gurumurthi | G06F 11/0793 |
| | | | 714/746 |
| 2006/0179185 A1* | 8/2006 | Daly | G06F 12/0897 |
| | | | 710/39 |
| 2008/0140902 A1* | 6/2008 | Townsend | H04B 1/0475 |
| | | | 710/306 |
| 2008/0307020 A1* | 12/2008 | Ko | G06F 21/6245 |
| 2009/0150605 A1* | 6/2009 | Flynn | G06F 13/28 |
| | | | 711/E12.001 |
| 2009/0210636 A1* | 8/2009 | Karamcheti | G11C 5/04 |
| | | | 711/E12.001 |
| 2009/0254689 A1* | 10/2009 | Karamcheti | G06F 16/2455 |
| | | | 707/E17.014 |
| 2010/0269015 A1* | 10/2010 | Borchers | G06F 12/0813 |
| | | | 710/308 |
| 2011/0161784 A1* | 6/2011 | Selinger | G06F 11/1016 |
| | | | 714/E11.002 |
| 2011/0236049 A1* | 9/2011 | Haga | G03G 15/5004 |
| | | | 399/75 |
| 2012/0072702 A1* | 3/2012 | Pierson | G06F 12/0897 |
| | | | 712/E9.033 |
| 2013/0024423 A1* | 1/2013 | Doshi | G06F 11/1448 |
| | | | 707/640 |
| 2013/0173554 A1* | 7/2013 | Ubukata | G06F 11/2094 |
| | | | 707/640 |
| 2013/0212319 A1 | 8/2013 | Hida et al. | |
| 2014/0095796 A1* | 4/2014 | Bell, Jr. | G06F 12/0855 |
| | | | 711/130 |
| 2014/0195720 A1* | 7/2014 | Akella | G06F 12/0246 |
| | | | 711/103 |
| 2014/0204106 A1* | 7/2014 | Hakura | G06T 1/60 |
| | | | 345/543 |
| 2014/0237147 A1* | 8/2014 | Joshi | G06F 3/0664 |
| | | | 710/74 |
| 2014/0348101 A1* | 11/2014 | Wang | H04W 88/08 |
| | | | 370/329 |
| 2015/0186068 A1 | 7/2015 | Benisty et al. | |
| 2015/0237139 A1* | 8/2015 | Chen | G06F 3/0604 |
| | | | 709/217 |
| 2016/0196216 A1* | 7/2016 | Lee | G06F 3/0631 |
| | | | 711/170 |
| 2016/0306822 A1* | 10/2016 | Waghulde | G06F 16/1847 |
| 2017/0132082 A1* | 5/2017 | Resch | G06F 11/1076 |
| 2017/0220463 A1* | 8/2017 | Malina | G06F 3/0688 |
| 2018/0157415 A1* | 6/2018 | Choi | G06F 12/0246 |
| 2018/0341602 A1* | 11/2018 | Venkataraman | G06F 13/1673 |
| 2019/0018599 A1* | 1/2019 | Katayama | G06F 9/30087 |
| 2019/0051324 A1* | 2/2019 | Zhao | G06F 3/0616 |
| 2019/0095133 A1* | 3/2019 | Grannaes | G06F 12/0246 |
| 2019/0129774 A1* | 5/2019 | Konan | G06F 11/0778 |
| 2019/0205244 A1* | 7/2019 | Smith | G06F 3/065 |
| 2020/0174675 A1 | 6/2020 | Jia et al. | |
| 2021/0191870 A1 | 6/2021 | Virani et al. | |
| 2021/0223994 A1* | 7/2021 | Kanno | G06F 3/0644 |
| 2022/0197561 A1* | 6/2022 | Na | G06F 3/0604 |
| 2022/0334765 A1* | 10/2022 | Jung | G06F 12/0246 |
| 2022/0342550 A1 | 10/2022 | Benisty et al. | |

OTHER PUBLICATIONS

Microsoft, "Computer Dictionary", 5th Edition, 2002, p. 81 (Year: 2002).*

* cited by examiner

|  | 4kB (μs) | 8kB (μs) | 64kB (μs) | Operations Needed in Test* |
|---|---|---|---|---|
| Average | 240 | 250 | 450 | : |
| 99% (2 nines) | 300 | 360 | 770 | >100 |
| 99.9% (3 nines) | 400 | 380 | 1,000 | >1,000 |
| 99.99% (4 nines) | 500 | 550 | 3,000 | >10,000 |
| 99.999% (5 nines) | 1,000 | 2,000 | 3,500 | >1e5 |
| 99.9999% (6 nines) | 3,000 | 4,000 | 5,000 | >1e6 |
| 99.99999% (7 nines) | 5,000 | 6,000 | 8,000 | >1e7 |
| 99.999999% (8 nines) | 7,000 | 8,000 | 10,000 | >1e8 |
| Maximum Timeout | 11,0000 | 12,000 | 20,000 | : |

FIG. 2

| Namespace | LBA | Size | Pointer to first cache buffer |
|---|---|---|---|
| ... | ... | ... | ... |
| ... | ... | ... | ... |

WRITE BUFFER LINKING FOR EASY CACHE READS

CROSS-REFERENCE TO RELATED APPLICATIONS

This application claims benefit of U.S. Provisional Patent Application Ser. No. 63/421,327, filed Nov. 1, 2022, which is herein incorporated by reference.

BACKGROUND OF THE DISCLOSURE

Field of the Disclosure

Embodiments of the present disclosure generally relate to improved optimization of a cache lookup operation by structuring the write cache buffers differently using a link-list.

Description of the Related Art

The enterprise SSD market has different requirements, especially in quality of service (QoS). QoS is extremely important causing strict requirements. Several benchmarks are used to test devices making sure that there are good results in the area.

In order to increase performance and parallelism in write command flow, the data storage device executes write commands in cache mode. Write data is stored in an intermediate buffer (SRAM or DRAM), a completion message is posted to the host and only later the data will be programmed in the NAND. When supporting the write caching mechanism, a cache coherency logic must be implemented in the data storage device in order to avoid coherency issues. For instance, when receiving two write commands that have an logical block address (LBA) overlap between them and the first command is completed (i.e. a completion message was posted to the host) before issuing the second command, the data associated with the first command is not allowed to override the data associated with the second command. To avoid the overriding, special logic is implemented that actually breaks the pipe, adds extra complexity, and has a performance degradation. The same applies to read commands received after sending a completion for the prior write command. In overlap scenarios, the last version of the data must be provided to the host and not the old version stored in the NAND.

In order to improve QoS, when detecting a read overlap command (i.e., the latest version is cached internally and not in the NAND), the data storage device needs to provide the data back to the host from the cache directly. The alternative is to flush the cache to the NAND and then issue the read but the previous approach suffers from QoS issues.

In a previous approach write cache buffers were linked which makes the lookup operation simplified and faster. To implement the linking, the first pointer of the first buffer for each command is held in an overlap table, the data buffers are managed per command in a link-list manner and the pointers are just needed for managing the cache so the pointers will not be stored in the NAND. Whenever detecting a collision, the pointer to the first buffer associated with the original write command is parsed from the overlap table. The logic will scan the buffers until finding the relevant buffer by walking through the link list. Finally, the data is fetched from the relevant buffer in the cache and provided to the host.

There is a need in the art for improved optimization of a cache lookup operation by structuring differently the write cache buffers using a link-list.

SUMMARY OF THE DISCLOSURE

The present disclosure generally relates to improved optimization of a cache lookup operation by structuring the write cache buffers differently using a link-list. Rather than executing a read command first and then executing a write command only after the read command is executed, this disclosure suggests reordering the command executions. A device waits before executing the read command giving the opportunity to obtain the overlap write command. The device then reorders the command execution and executes first the write command and then executes the read command by accessing the write cache instead of the NAND. When two write commands need to be executed consecutively, the link-list operation is used. The controller finds the relevant buffer in the cache that is needed and overwrites the buffer with the new data. The new data is then written to the cache without accessing the cache multiple times.

In one embodiment, a data storage device comprises: a memory device; and a controller coupled to the memory device, wherein the controller is configured to: receive a read command for a first LBA; receive a write command for the first LBA; reorder the write command and the read command; execute the write command to write the first LBA to cache; and execute the read command by reading the first LBA from the cache.

In another embodiment, a data storage device comprises: a memory device; and a controller coupled to the memory device, wherein the controller is configured to: receive a first write command for a first LBA; execute the first write command to write the first LBA to cache; receive a second write command for the first LBA; and execute the second write command to overwrite the first LBA in the cache.

In another embodiment, a data storage device comprises: memory means; a controller coupled to the memory means, wherein the controller is configured to: receive either a read command a first LBA or a first write command for the first LBA; detect a second write command for the first LBA; either: reorder the read command and second write command; or write the first LBA from the first write command to cache; write the second write command for the first LBA to the cache; and write the first LBA from the cache to the memory means.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2 is a table illustrating QoS requirements in low-queue-depth, according to certain embodiments.

FIG. 3 is table illustrating an overlap table structure, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to improved optimization of a cache lookup operation by structuring the write cache buffers differently using a link-list. Rather than executing a read command first and then executing a write command only after the read command is executed, this disclosure suggests reordering the command executions. A device waits before executing the read command giving the opportunity to obtain the overlap write command. The device then reorders the command execution and executes first the write command and then executes the read command by accessing the write cache instead of the NAND. When two write commands need to be executed consecutively, the link-list operation is used. The controller finds the relevant buffer in the cache that is needed and overwrites the buffer with the new data. The new data is then written to the cache without accessing the cache multiple times.

Figure 1:
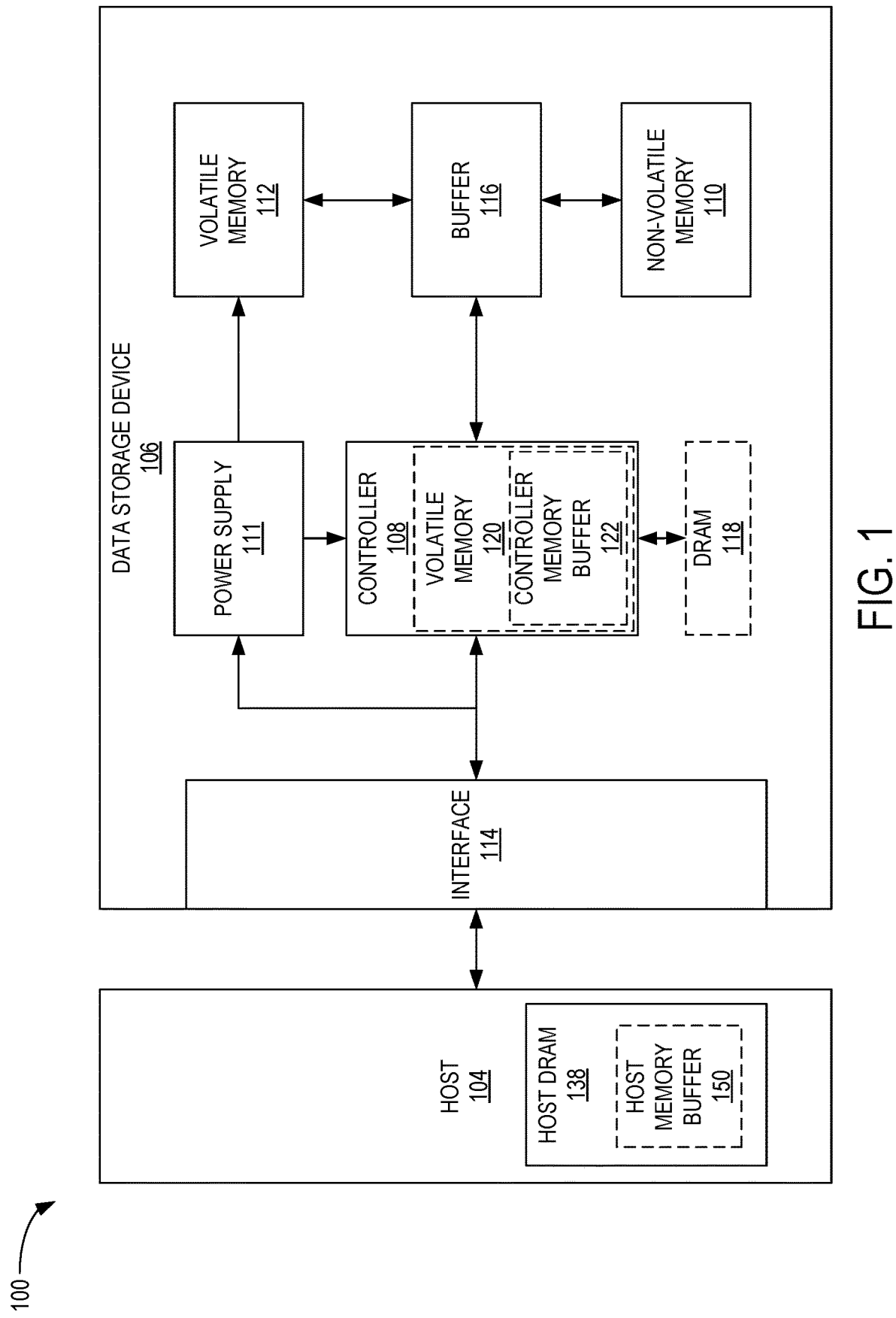
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

FIG. 2 is a table 200 illustrating QoS requirements in low-queue-depth, according to certain embodiments. The QoS results depend on the workload and therefore the requirements are based on a specific workload. Table 200 refers to a queue depth of one (i.e. only a single command) executed by the storage device at a time. Different requirements are set for other queue depths (e.g. low and high queue depths).

One example of the requirements is the latency of the I/O commands. In client SSDs, there are not any strict requirements in latency, but only in performance. Enterprise solutions are ranked based on their QoS, which is measured in the "nines" technique. Table 200 illustrates one example of the "nines" classification. A data storage device that is classified as "2 nines", should complete 99% of a 4 KB read command in less than 300 microseconds. A data storage device that is classified as "3 nines" should support the "2 nines" requirement and 99.9% of the 4 KB read command should be completed within 400 microseconds and so on.

FIG. 3 is table illustrating an overlap table 300 structure, according to certain embodiments. Overlap table 300 holds the LBA ranges held in the cache and the pointer to the first cache buffer that holds the data for a command (this is a new part). Overlap table 300 is updated with a new entry when executing a write command. The entry is removed from overlap table 300 after completing the program in the NAND interface. Whenever receiving a read or a write command, a lookup operation is implemented in order to detect overlap scenarios.

In operation, initially, a read command is received. After the command is received then a scan is done to look up in overlap table 300 to determine whether there is any overlap with the command and the parameters that are stored in overlap table 300. The parameters being the namespace and the LBA ranges. If overlap is found, the pointer to the first cache buffer is used to find the exact buffer that is relevant for the read command.

Figure 4:
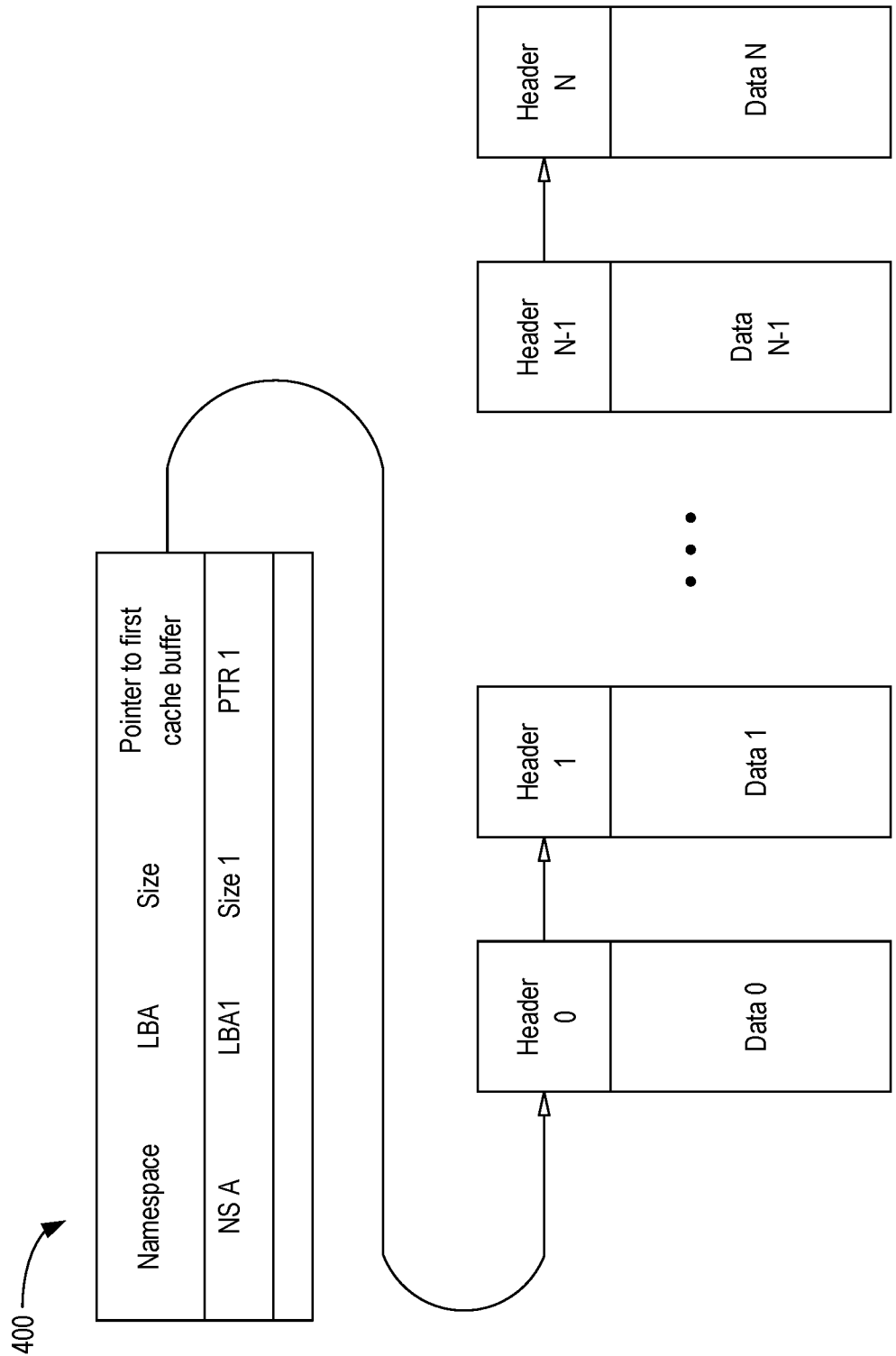
FIG. 4 is a schematic diagram illustrating a structure of internal write buffers using link-list, according to certain embodiments.

FIG. 4 is a schematic diagram illustrating a structure 400 of internal write buffers using link-list, according to certain embodiments. The internal write buffer may be stored in DRAM or SRAM for example. The relevant entry in the overlap table such as overlap table 300 in FIG. 3 holds the pointer to the first data buffer. The header part of the first data buffer holds a pointer to the next buffer and so on. In case of overlap, the logic just needs to scan the buffers where overlap was detected using the link-list compared to scanning the entire cache in previous approaches. Importantly, the pointers are not stored in the NAND. The pointers are just needed for cache management and simple lookup operation.

The overlap table comprises a namespace (NS A) entry, a LBA (LBA 1) entry, a size (Size1) entry, and a pointer to the first cache (PTR1) entry. PTR1 points to the first set of data (buffers) in structure 400. The buffers include a header and data. The header describes the data, and each data in the buffer is 4K. The first pointer will point to the first buffer. In the buffer, the header will have a pointer that points to the next buffer. The structure organization will continue for the total amount of buffers that are available. The last buffer will not have a pointer to point to the next buffer since there is no buffer after the last buffer.

When a read command is received, a lookup will be done in the overlap table. An entry will be found with some overlap. The first pointer will be used from the entry to scan the buffers associated with the read command in order to find the exact buffers that are relevant for the read command. For example, the size of a write command is 1 MB, but the size of the read command is 4K. The first pointer will scan the buffers to find the relevant buffer for the read command. In this case, only one buffer is used because the size of the read command is only 4K. Though only one entry is discussed, it should be understood that there are a plurality of entries in the overlap table. Due to the many entries there will be many link-lists.

Figure 5:
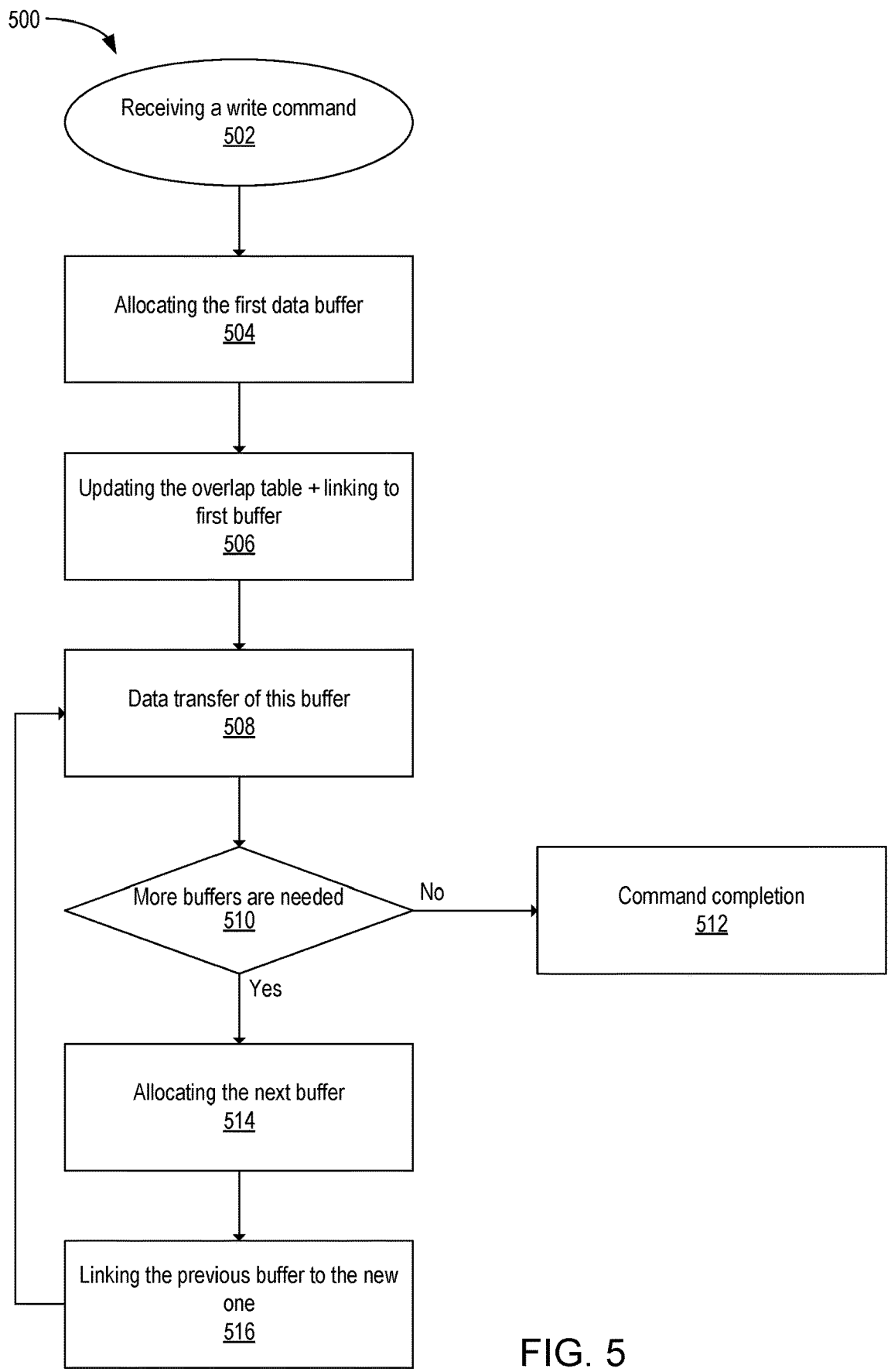
FIG. 5 is a flowchart illustrating a method for a write command execution flow, according to certain embodiments.

FIG. 5 is a flowchart illustrating a method 500 for a write command execution flow, according to certain embodiments. The flow starts by receiving a write command at 502. A controller, such as the controller 108 of FIG. 1, allocates a first buffer at 504. The controller then updates an overlap table, such as overlap table 300 in FIG. 3, with a link to the first buffer at 506 and issues a data transfer for the first 4 KB of the write command at 508. If more buffers are needed as determined at 501, the controller allocates the next buffer at 514. Also, the controller will link the previous buffer to the new buffer at 516 and issue the transfer. This flow is repeated until completing the command. If no more buffers are needed at 510, then the command is completed at 512.

More specifically, method 500 begins at block 502. At block 502, a controller receives a write command from the host, such as host 104 of FIG. 1. At block 504, the first data buffer will be allocated. At block 506, the overlap table is updated and is linked to the first buffer. The update will include the relevant parameters such as the namespace, the LBA, the size, and a pointer to a first buffer. At block 508, there is a data transfer for the first buffer. The data transfer will consist of reading the first 4K from the host and populating the 4K data to the first buffer. At block 510, the controller must determine whether more buffers are needed. If the controller determines there are no more buffers needed, then the specific write command is less than 4K and method 500 will proceed to block 512. At block 512, the command is completed and a completion message is sent to the host. If the controller determines there are more buffers needed, then the specific write command is more than 4K and method 500 will proceed to block 514. At block 514, a next buffer will be allocated. Method 500 proceeds to block 516 at the completion of block 514. At block 516, the first buffer is linked with the new buffer. Linking the new buffer with the previous buffer involves putting the pointer in the header of the previous buffer. After the completion of block 516 method 500 will return to block 508. Method 500 will continue to loop until no more buffers are needed.

Figure 6:
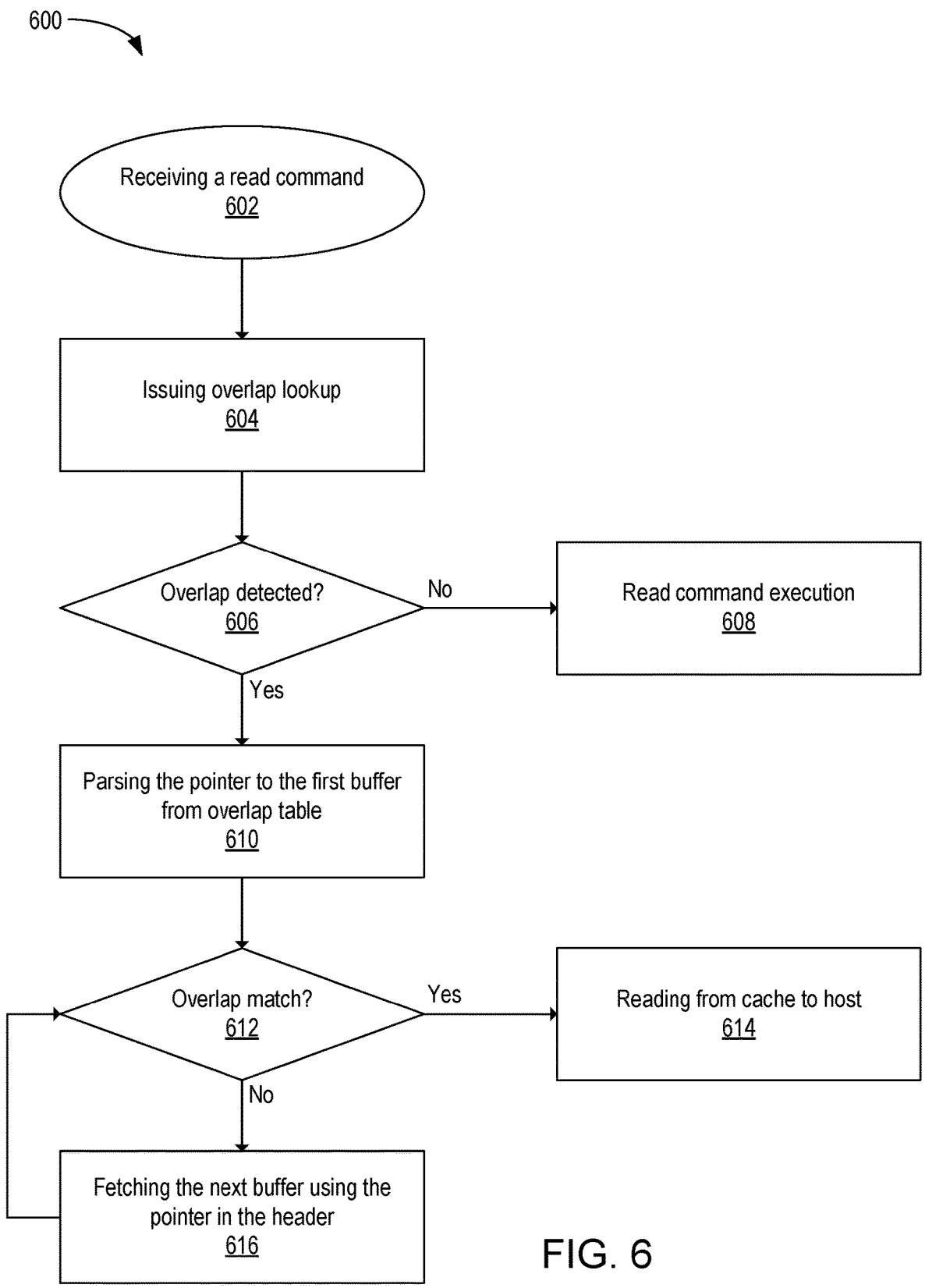
FIG. 6 is a flowchart illustrating a method for an overlap read command execution flow, according to certain embodiments.

FIG. 6 is a flowchart illustrating a method 600 for an overlap read command execution flow, according to certain embodiments. The flow starts by receiving a read command at 602. The device controller, such as the controller 108 of FIG. 1, parses the LBA range of the read command. The device controller will also issue a lookup operation to detect a cache overlap scenario at 604. If overlap is not detected at 606, the read command is executed by accessing the NAND at 608. Otherwise, the pointer for a first buffer describing the write command of method 500 is parsed from the overlap table at 610. Then, the device controller scans the relevant buffers using the link list to find the relevant buffer. Once a relevant buffer is found at 612, the data is fetched from this buffer and provided to the host at 614. The overlap search continues at 616 if the overlap match is not found at 612.

More specifically, the method 600 begins at block 602. At block 602, a controller receives a read command from the host, such as host 104 of FIG. 1. At block 604, an overlap lookup is issued. At block 606, the controller determines whether there is overlap in the overlap table such as overlap table 300 of FIG. 3. The controller will scan the overlap lookup table using the namespace and LBA range stored in the lookup table including the parameters from the read command. If the controller determines there is no overlap then method 600 will proceed to block 608. At block 608, the read command will be executed. If the controller determines there is overlap at 606 then method 600 will proceed to block 610. At block 610, the pointer is parsed from the overlap table to the first buffer.

When block 610 is completed, method 600 will proceed to block 612. At block 612, the controller determines whether there is an overlap match. If the controller determines there is an overlap match, method 600 will proceed to block 614. Overlap matching is determined if the pointer from the first buffer of the first overlap table is the exact pointer needed by the host. At block 614, the data will be read from the cache to the host. The data will be read from the first buffer and written to the host so that the command is completed. If the controller determines there is no overlap match, method 600 will proceed to block 616. At block 616, the controller will fetch the next buffer using the pointer in the header. The controller will scan the link-list table to fetch the next buffer that has the overlap needed by the host. At the completion of block 616, method 600 will return to block 612. Method 600 will continue to loop until the overlap match is found, if overlap is detected.

Figure 7:
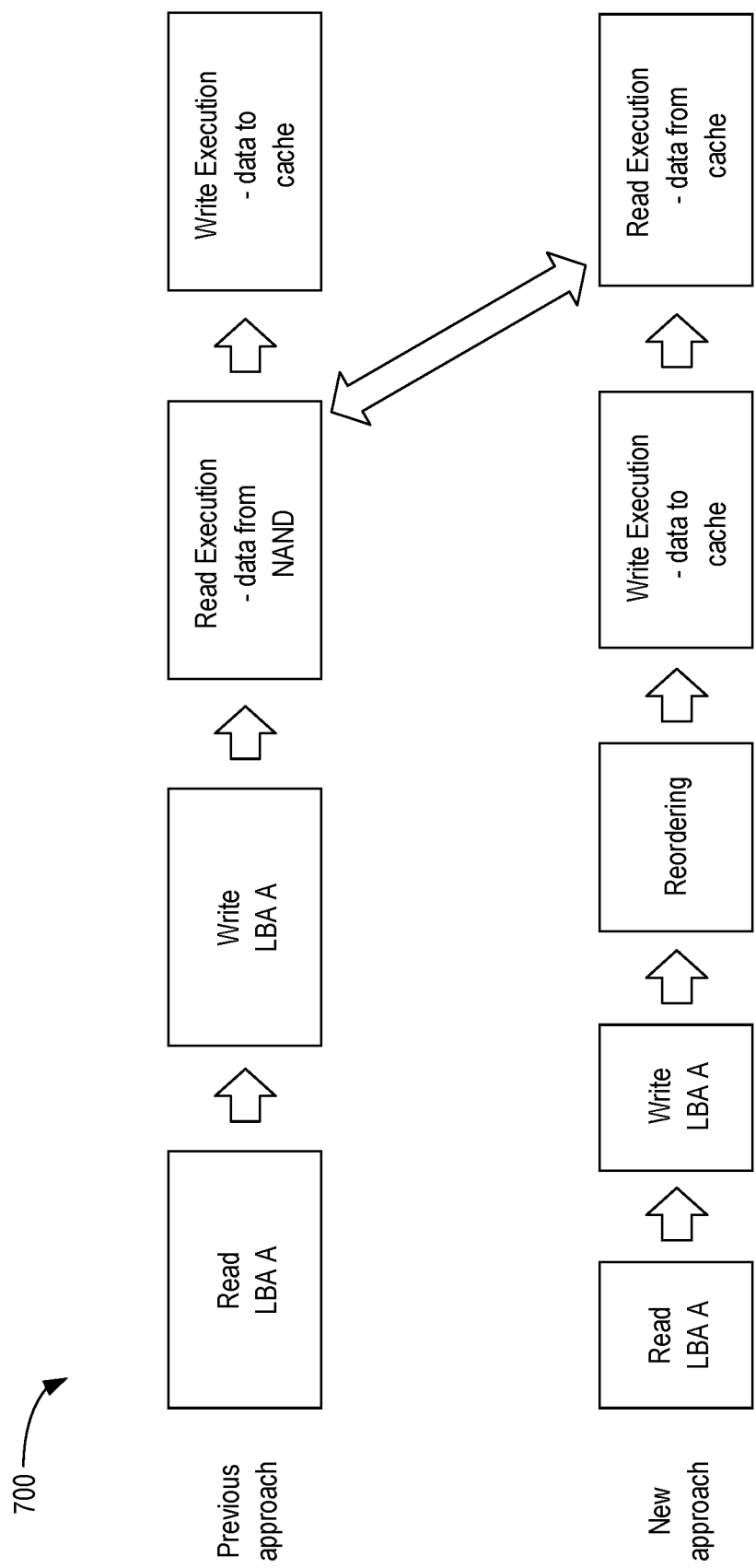
FIG. 7 is a schematic diagram illustrating a method for reordering optimization, according to certain embodiments.

The cache link can be leveraged for improving performance and QoS. One method for improving is to accelerate the input/output (IO) performance in overlap scenarios which is more relevant for client as the workload is not completely random and for benchmarks as well. FIG. 7 is a schematic diagram illustrating a method 700 for reordering optimization, according to certain embodiments. Method 700 is used for accelerating the IO performance in overlap scenarios. FIG. 7 depicts the behavior in a previous approach compared to a current approach when in a write after read flow. In write after read flow, the data storage device first gets the read command and executes the command and only after the read command is executed will the write command be executed. In the previous approach, the read command is executed by accessing the NAND and only then is the write command executed. In the current approach, the device controller predicts that in the next command, there is a write overlap command. The device waits before executing the read command giving the opportunity to get the overlap write command. The device reorders the command execution and executes the write command first. Finally, the device executes the read command by accessing the write cache instead of the NAND. The current approach improves the performance and QoS of the system.

The predicting can be a straightforward mechanism since in most cases the write overlap command is already queued in the host. The data storage device may simply scan the submission queues and check whether there is an overlap command or not. In other embodiments, other prediction mechanisms may be sued either based upon history or more complex algorithms such as machine learning (ML) or artificial intelligence (AI).

For example, in the previous approach sequence of method 700, a command to read LBA A is executed first. The data of LBA A will be read from the NAND. Only after the read command is executed will the command to write LBA A be executed. The LBA A data from the host such as host 104 of FIG. 1 will be held in the cache and the command is completed. The execution of the read command takes some time. If the commands are reordered optimization can be introduced.

For example, in the new approach sequence of method 700, when a read command to read LBA A and a command to write LBA A are detected, reordering of the commands will occur. The command to write the data of LBA A to the cache is executed. The write command is preferred to be executed before the read command. After the write command is executed, the read command is executed. The read command will read the LBA A data from the cache and provide the data back to the host. Detection for the new approach may be very simple or complex. Detection may be, history analysis, machine learning, artificial intelligence (AI), for example. Benchmark is also a simple detection method used since benchmark checks the performance of many systems currently. In the new approach, during the read operation the NAND does not need to be accessed because the data is stored in the cache. Only the cache needs to be accessed increasing the performance.

Figure 8:
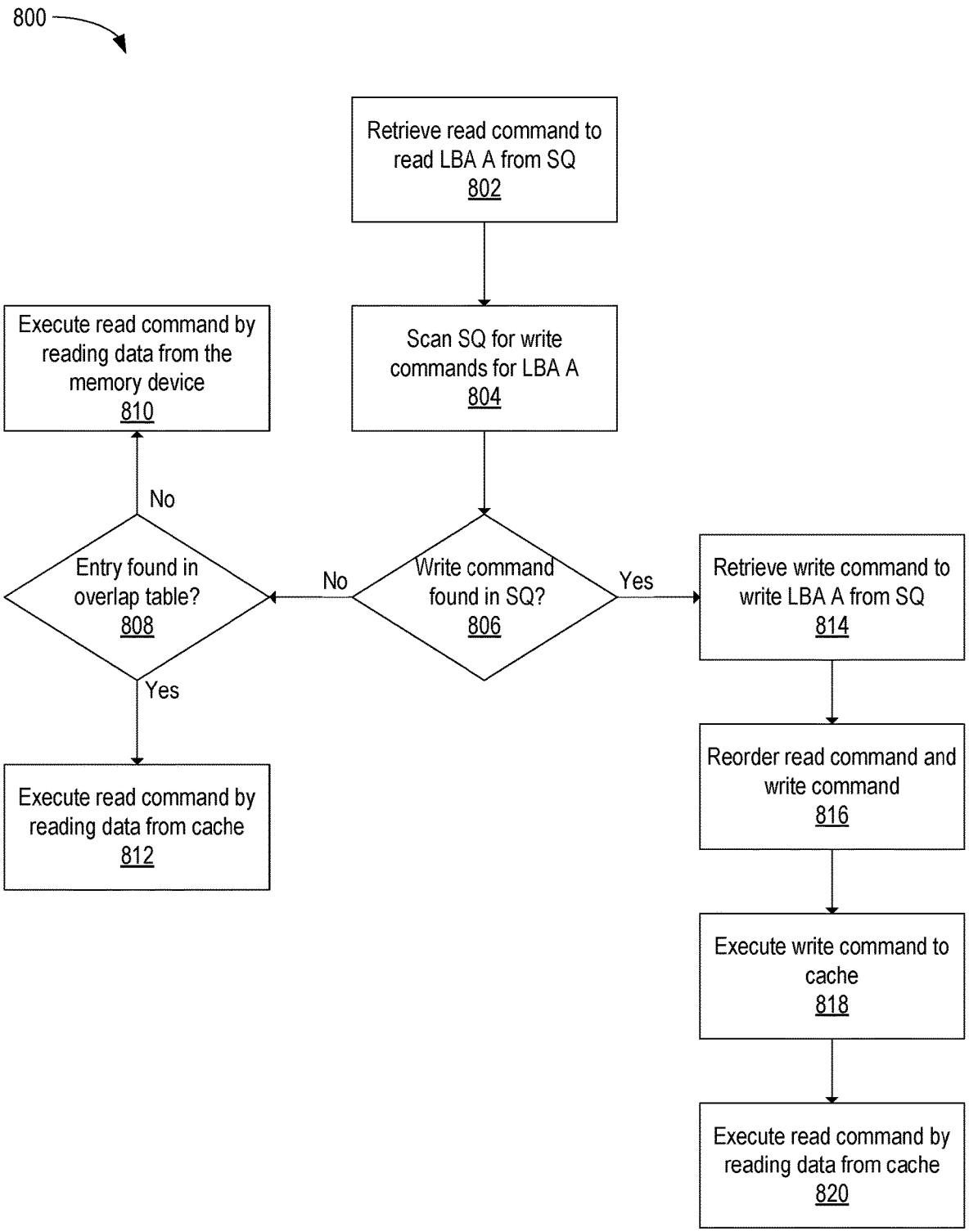
FIG. 8 is a flowchart illustrating a method for overlap read command execution flow, according to certain embodiments.

FIG. 8 is a flowchart illustrating a method 800 for overlap read command execution flow, according to certain embodiments.

Method 800 begins at block 802. At block 802, a read command to read LBA A from the submission queue (SQ) is retrieved. At block 804, the controller, such as controller 108 of FIG. 1, scans the SQ for write commands for LBA A. The controller can scan all SQ's or a portion of the total amount of SQ's. At block 806, the controller determines whether a write command is found in the SQ. If the controller determines a write command is not found in the SQ, then method 800 proceeds to block 808. If the controller determines a write command is found in the SQ, then method 800 proceeds to block 814. At block 808, the controller determines whether an entry is found in the overlap table, such as overlap table 300 of FIG. 3. If the controller determines no entry is found, then method 800 proceeds to block 810. At block 810, the read command is executed by reading data from the memory device. If the controller determines that an entry is found, then method 800 proceeds to block 812. At block 812, the read command is executed by reading data from the cache.

If at block 806 the controller determines the write command is found in the SQ, then at block 814, the write command is retrieved to write LBA A from the SQ. At block 816, the read command and the write command are reordered. At block 818, the write command is executed to write the data to the cache. At block 820, the read command is executed by reading the data from the cache.

Figure 9:
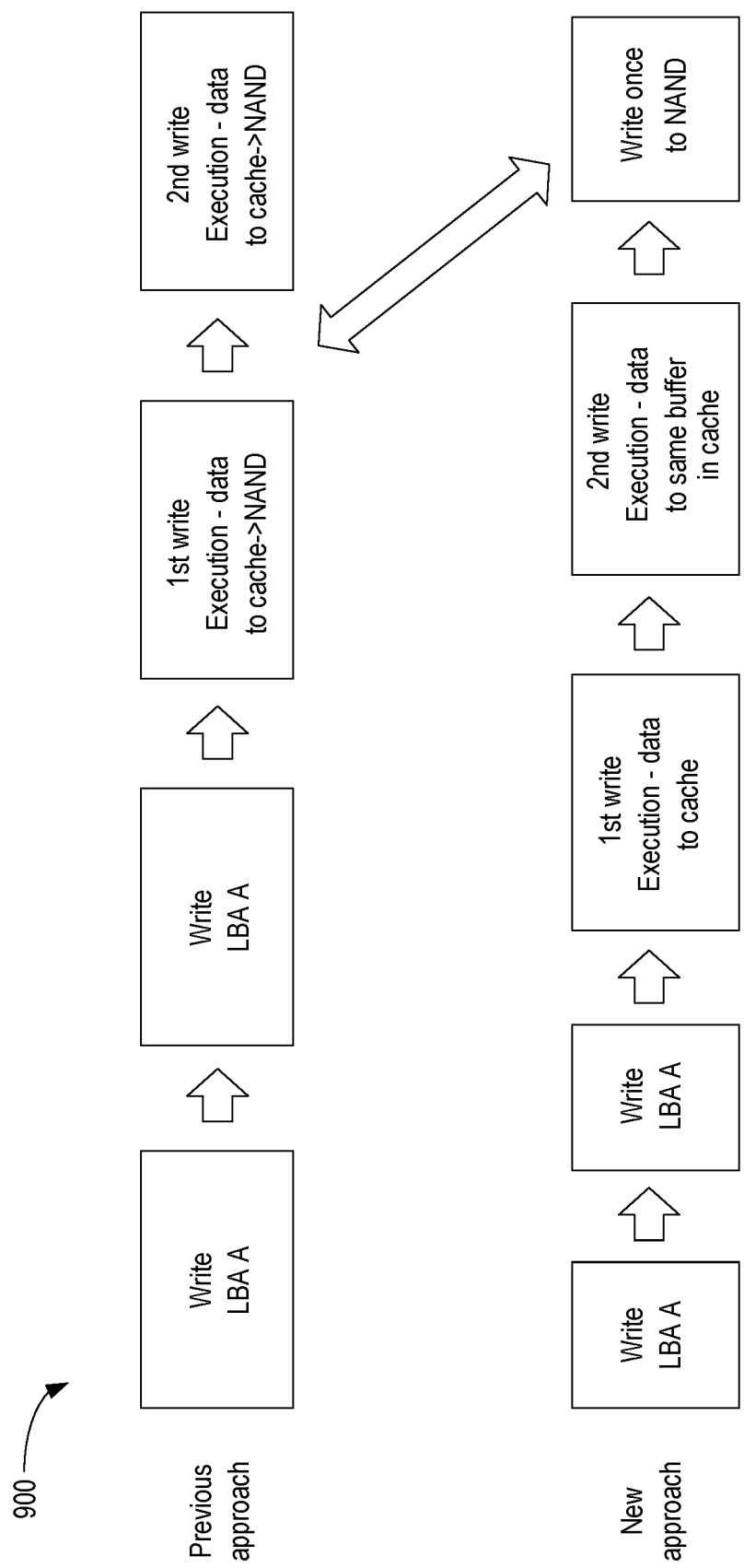
FIG. 9 is a schematic diagram illustrating a method for write after write optimization, according to certain embodiments.

FIG. 9 is a schematic diagram illustrating a method 900 for write after write optimization, according to certain embodiments. Method 900 is used for accelerating the write after write path. In the previous approach, two separate buffers were allocated in the cache for holding the data. Once allocated to the cache, both the buffers may be written to the NAND. In the new approach, the same write buffer is used. Using the link-list approach, the controller such as controller 108 of FIG. 1, finds the relevant buffer in the cache quickly. The new data overwrites the buffer while only accessing the NAND once.

For example, in the previous approach sequence of method 900 two write commands need to be executed. First, the command to write LBA A will be executed. Following, the command to write LBA A with different data will be executed. The host, such as host 104 of FIG. 1, provides the two commands with different data. The first write command will be executed by writing the data to the cache and then to the NAND. Thereafter, the second write command will be executed by writing the data to the cache and then to the NAND. There will be multiple accesses to the NAND in order to write the data from both the commands. In the new approach, the access to the NAND can be decreased.

For example, in the new approach sequence of method 900, two write commands need to be executed. First, the command to write LBA A will be executed by writing the data to cache. Thereafter, the second command will use the link-list approach. A lookup operation will detect overlap in the buffer. The controller will determine the specific buffer that the overlap occurs and overwrite the data in cache. The new data will then get written once to the NAND. This avoids the NAND from being over accessed if there is over lapping data which leads to increased performance.

Figure 10:
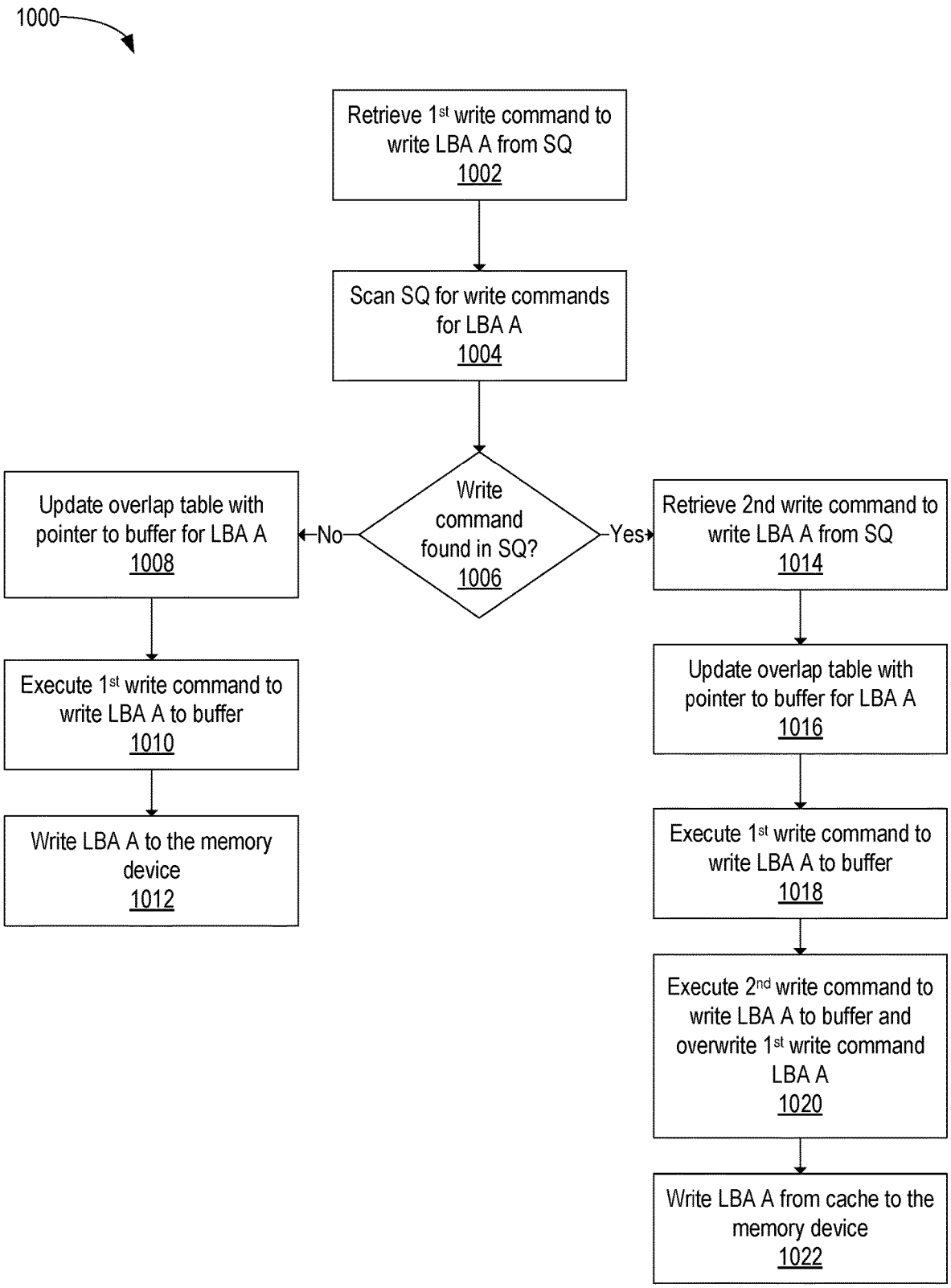
FIG. 10 is a flowchart illustrating a method for overlap read command execution flow, according to certain embodiments.

FIG. 10 is a flowchart illustrating a method 1000 for overlap write command execution flow, according to certain embodiments. Method 1000 is used for accelerating the write after write path. Using the link-list approach, the controller such as controller 108 of FIG. 1 finds the relevant buffer in the cache quickly. The new data overwrites the buffer with the new buffer data. The new data is then written to the NAND once avoiding multiple writes to the NAND.

Method 1000 begins at block 1002. At block 1002, a first write command to write LBA A from SQ is retrieved. At block 1004, the controller such as controller 108 of FIG. 1, scans the SQ for write commands for LBA A. The controller can scan all SQ's or a portion of the total amount of SQ's. At block 1006 the controller determines whether a write command is found in the SQ. If the controller determines a write command is found in the SQ, then method 1000 proceeds to block 1014. If the controller determines a write command is not found in the SQ, then method 1000 proceeds to block 1008. At block 1008, the controller updates the overlap table with pointer to a buffer for LBA A. At block 1010, the controller executes the first write command to write LBA A to the buffer. At block 1012, the controller writes the LBA A to the memory device.

If a write command is found in the SQ at block 1006, then at block 1014, a second write command is retrieved to write LBA A from the SQ. At block 1016, the controller updates the overlap table with a pointer to a buffer for LBA A. At block 1018, the controller executes the first write command to write LBA A to the buffer. At block 1020, the controller executes the second write command to write LBA A to the buffer and overwrite the first write command LBA A. Overwriting the first write command is avoided when executing the second write command to write LBA A to the buffer if a second write command is retrieved before the first write command is executed. At block 1022, the controller writes the LBA A from the cache to the memory device.

If the data storage device receives two write commands before execution of either write command, there is no need to transfer twice the overlap range. For example, if command 1 is to write LBA0 and command 2 is to write LBA0 and LBA1, then the data storage device can just transfer LBA0 and LBA1 from the second command since the data from the first command is going to be overwritten anyway. If the data storage device first receives the first command and executes the first command and only then receives the second command, the buffer from the first command is reused and the data is overwritten with the data from the second command.

By leveraging lookup tables, better QoS is achieved by simplifying the flow in the case of reading from cache which will permit meeting a seven nine's requirement without having a complex flow.

In another embodiment, a data storage device comprises: a memory device; and a controller coupled to the memory device, wherein the controller is configured to: receive a read command for a first LBA; receive a write command for the first LBA; reorder the write command and the read command; execute the write command to write the first LBA to cache; and execute the read command by reading the first LBA from the cache. Executing the write command comprises: allocating a first data buffer; updating an overlap table; and transferring data to the first data buffer. Executing the write command further comprises: determining whether an additional buffer is needed; allocating the additional buffer; and linking the first data buffer to additional buffer. Linking the first data buffer to the additional buffer comprises adding a pointer in a header of the first data buffer, wherein the pointer points to the additional buffer. The overlap table comprises a pointer to the first data buffer. Executing the read command further comprises: issuing an overlap table lookup; determining whether an overlap is detected; search buffers in cache; and read data from cache. Executing the read command further comprises parsing a pointer from the overlap table to a first buffer. Executing the read command further comprises: fetching a first buffer associated with the pointer; determining whether the first buffer comprises the data to be read; fetch a next buffer; and read the data from the next buffer. Executing the read command further comprises retrieving a pointer to the next buffer from a heading in the first buffer.

In another embodiment, a data storage device comprises: a memory device; and a controller coupled to the memory device, wherein the controller is configured to: receive a first write command for a first LBA; execute the first write command to write the first LBA to cache; receive a second write command for the first LBA; and execute the second write command to overwrite the first LBA in the cache. Executing the first write command comprises: allocating a first data buffer; updating an overlap table with a pointer to the first data buffer for the first LBA; and transferring data to the first data buffer. Executing the second write command comprises transferring data to the first data buffer. The overlap table remains unchanged during the executing the second write command. Executing the second write command comprises writing the first LBA from the second write command to the memory device. The controller is further configured to search a submission queue after receiving the first write command and prior to executing the first write command. Executing the second write command results in a least a portion of data from the first write command remaining unchanged in one or more buffers. The first LBA from the first write command in cache is not written to the memory device.

In another embodiment, a data storage device comprises: memory means; a controller coupled to the memory means, wherein the controller is configured to: receive either a read command a first LBA or a first write command for the first LBA; detect a second write command for the first LBA; either: reorder the read command and second write command; or write the first LBA from the first write command to cache; write the second write command for the first LBA to the cache; and write the first LBA from the cache to the memory means. Writing the second write command to the cache comprises overwriting the first LBA from the first write command. The controller is further configured to read the first LBA from the cache.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
   a memory device; and a controller coupled to the memory device, wherein the controller is configured to:

receive a read command for a first LBA, wherein the first LBA is a LBA in the memory device;

scan a submission queue (SQ) for write commands for the first LBA after receiving the read command for the first LBA;

retrieve a first write command for the first LBA from the SQ;

reorder the first write command and the read command;

execute the first write command to write the first LBA to cache and update an overlap table;

scan the SQ for write commands for the first LBA after executing the first write command;

retrieve a second write command from the SQ, wherein the second write command is for the first LBA and a second LBA;

execute the second write command by overwriting the first LBA in the cache and writing the second LBA to the cache and update the overlap table;

determine that an overlap exists by scanning the overlap table;

parse a pointer from the overlap table;

determine whether the pointer is not an exact pointer for the read command;

scan a link list table and fetch a next buffer, wherein the link list table is separate and distinct from the overlap table;

repeat the determining and scanning the link list table until finding the exact pointer; and execute the read command by reading the first LBA from the cache instead of the memory device, wherein executing the read command occurs after executing the second write command and after the repeating.

2. The data storage device of claim 1, wherein executing the first write command comprises:
   allocating a first data buffer;
   updating the overlap table; and
   transferring data to the first data buffer.

3. The data storage device of claim 2, wherein executing the first write command further comprises:
   determining whether an additional buffer is needed;
   allocating the additional buffer; and
   linking the first data buffer to the additional buffer.

4. The data storage device of claim 3, wherein linking the first data buffer to the additional buffer comprises adding a pointer in a header of the first data buffer, wherein the pointer points to the additional buffer.

5. The data storage device of claim 2, wherein the overlap table comprises a pointer to the first data buffer.

6. The data storage device of claim 1, wherein executing the read command further comprises:
   issuing an overlap table lookup;
   determining whether an overlap is detected;
   search buffers in cache; and
   read data from cache.

7. The data storage device of claim 6, wherein executing the read command further comprises parsing a pointer from the overlap table to a first buffer.

8. The data storage device of claim 7, wherein executing the read command further comprises:
   fetching a first buffer associated with the pointer;
   determining whether the first buffer comprises the data to be read;
   fetch the next buffer; and
   read the data from the next buffer.

9. The data storage device of claim 8, wherein executing the read command further comprises retrieving a pointer to the next buffer from a heading in the first buffer.

10. The data storage device of claim 1, wherein executing the first write command comprises:
    allocating a first data buffer;
    updating the overlap table with a pointer to the first data buffer for the first LBA; and
    transferring data to the first data buffer.

11. The data storage device of claim 10, wherein executing the second write command comprises transferring data to the first data buffer.

12. The data storage device of claim 11, wherein the overlap table remains unchanged during the execution of the second write command.

13. The data storage device of claim 12, wherein executing the second write command comprises writing the first LBA from the second write command to the memory device.

14. The data storage device of claim 1, wherein executing the second write command results in at least a portion of data from the first write command remaining unchanged in one or more buffers.

15. The data storage device of claim 1, wherein the first LBA from the first write command in cache is not written to the memory device.

* * * * *